US008717292B2

(12) United States Patent
Niikawa (10) Patent No.: US 8,717,292 B2
(45) Date of Patent: May 6, 2014

(54) MOVING OBJECT DETECTING APPARATUS, MOVING OBJECT DETECTING METHOD, POINTING DEVICE, AND STORAGE MEDIUM (75) Inventor: Takuya Niikawa, Osaka (JP)

(73) Assignee: Osaka Electro-Communication University, Osaka (JP)

( * ) Notice: Subject to any disclaimer, the term of this patent is extended or adjusted under 35 U.S.C. 154(b) by 628 days.

(21) Appl. No.: 12/666,222

(22) PCT Filed: Aug. 7, 2007

(86) PCT No.: PCT/JP2007/065404
§ 371 (c)(1),
(2), (4) Date: Dec. 22, 2009

(87) PCT Pub. No.: WO2009/019760
PCT Pub. Date: Feb. 12, 2009

(65) Prior Publication Data
US 2010/0201621 A1 Aug. 12, 2010

(51) Int. Cl.
G06F 3/033 (2013.01)
G09G 5/08 (2006.01)

(52) U.S. Cl.
USPC ........................................................ 345/158

(58) Field of Classification Search
USPC ........................................................ 345/158
See application file for complete search history.

(56) References Cited

U.S. PATENT DOCUMENTS 6,033,072 A    3/2000  Ono et al.
6,219,034 B1 * 4/2001  Elbing et al. .................. 345/158
6,295,049 B1 * 9/2001  Minner ......................... 715/856
6,353,436 B1 * 3/2002  Reichlen ....................... 345/427

FOREIGN PATENT DOCUMENTS

JP    11-110120     4/1999
JP    11-282617    10/1999
JP    2002-063578   2/2002
JP    2002-230531   8/2002
JP    2006-087751   4/2006
JP    2006-309291  11/2006

OTHER PUBLICATIONS

International Search Report for PCT/JP2007/065404 mailed Nov. 20, 2007.
Levine, James L., "An Eye-Controlled Computer," IBM Thomas J. Watson Research Center, Res. Rep. RC-8857, Yorktown Heights, N.Y., (May 28, 1981) Computer Science (16 pages).

(Continued)

Primary Examiner — Quan-Zhen Wang
Assistant Examiner — Nelson D Runkle, III
(74) Attorney, Agent, or Firm — Foley & Lardner LLP (57) ABSTRACT Even when a user is gazing at one point intentionally but the eyeball of the user is actually moving slightly, the slight movement is not reproduced as it is as the position of a cursor but a determination is made that the user is gazing at one point intentionally, that is, the eyeball is stopping. Thus, when a determination is made that the eyeball is stopping, the cursor is displayed still even when the gazing point is moving slightly depending on the slight movement. Furthermore, when a determination is made that the cursor is stopped, selection of an object such as other icon displayed at a position where the cursor is displayed is identified.

13 Claims, 8 Drawing Sheets (56) References Cited

OTHER PUBLICATIONS

Mateo et al., "Gaze Beats Mouse: Hands-Free Selection by Combining Gaze and EMG" CHI 2008 Extended Abstracts on Human Factors in Computing Systems, Proceedings: pp. 3039-3044 (Apr. 10, 2008).

Zhai et al., " Manual and Gaze Input Cascaded (Magic) Pointing," Proceeding of the SIGCHI Conference on Human Factors in Computing Systems. pp. 246-253, 1999.

* cited by examiner

MOVING OBJECT DETECTING APPARATUS, MOVING OBJECT DETECTING METHOD, POINTING DEVICE, AND STORAGE MEDIUM

CROSS-REFERENCE TO RELATED APPLICATIONS

The present application is a U.S. national stage application claiming the benefit of International Application No. PCT/JP2007/065404, filed on Aug. 7, 2007, the entire contents of which is incorporated herein by reference in its entirety.

BACKGROUND

1. Technical Field

The present invention relates to a moving object detecting apparatus that detects a movement of a moving object. Particularly, the present invention relates to a moving object detecting apparatus and a moving object detecting method capable of determining a moving object, which is supposed to be stopping or is moving slightly while it is intended to stop, as it is stopping in accordance with the characteristic of slight movement of the moving object, a pointing device using the moving object detecting apparatus and/or method, a computer program causing a computer to function as the moving object detecting apparatus, and a storage medium storing the computer program.

2. Description of Related Art

Technologies have been widely used that detect a movement of a moving object by using a sensor, determine whether it is moving or not, and perform various controls based on a quantity of movement when it is moving. The sensor may include an image sensor based on a two-dimensional image. A technology that detects the movement of a moving object from a discriminative form or contour contained in a captured image and further detects a spatial movement from a change in size of the discriminative form or contour contained in the captured image is disclosed in Japanese Patent Application Laid-Open No. 2002-63578.

DETAILED DESCRIPTION

With reference to drawings illustrating an embodiment of the present invention, the embodiment will be described more specifically below. Notably, an embodiment as will be described below is an example in which a pointing device based on an eye-controlled input is implemented by applying a moving object detecting apparatus to a pointing device included in a personal computer, detecting a movement of an eyeball (or movement of a line of sight) of a user with respect to a display connected to a personal computer, and displaying a cursor in accordance with the movement of the eyeball.

Figure 1:
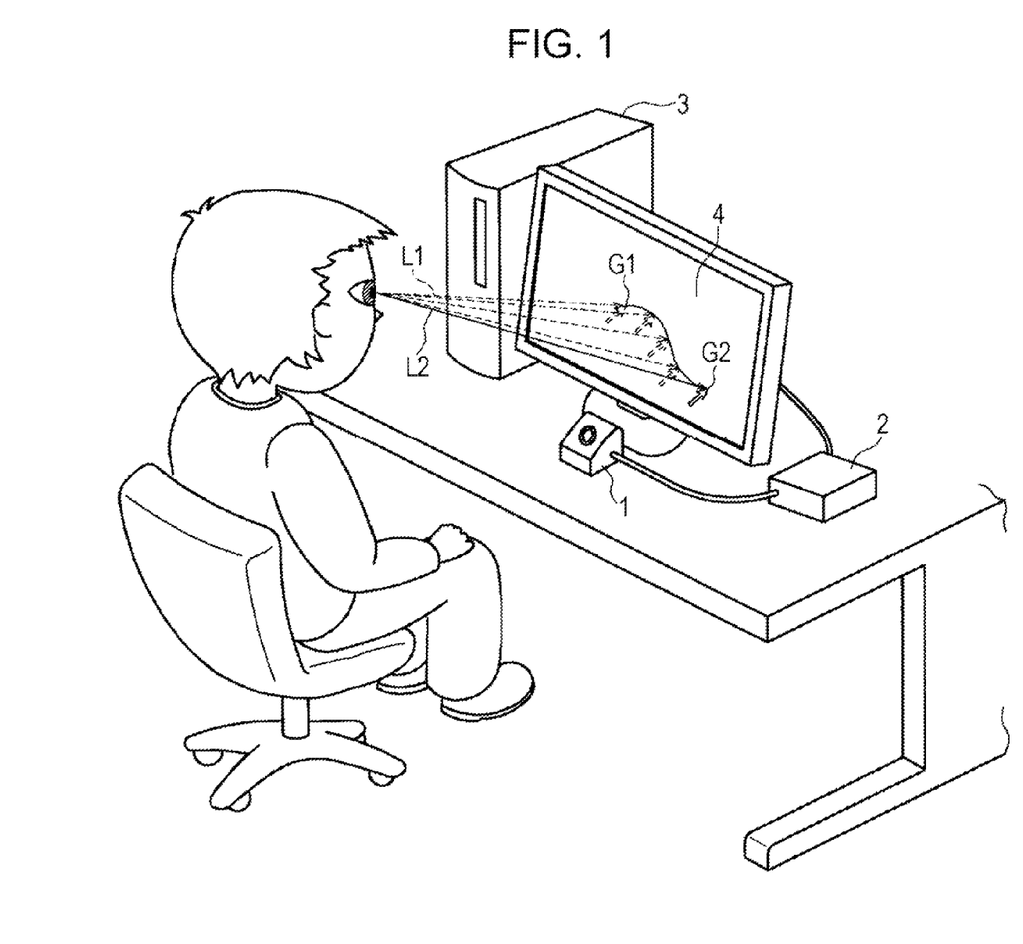
FIG. 1 is an explanatory diagram illustrating a principle of a pointing device according to the present embodiment.

FIG. 1 is an explanatory diagram illustrating a principle of a pointing device according to the present embodiment. FIG. 1 illustrates an imaging apparatus 1 that images a movement of an eyeball of a user. FIG. 1 further illustrates an eye-ball movement detecting apparatus 2 that detects a movement of an eyeball of a user based on the captured image input from the imaging apparatus 1. FIG. 1 further illustrates a personal computer (PC) 3 to be used by a user. The PC 3 is connected to a display 4, and an image signal representing a display screen including a GUI (graphical user interface) such as a window and a cursor rendered based on the operation on the PC 3 is output to the display 4.

The pointing device according to the present embodiment is implemented in accordance with the principle as follows. The eyeball movement detecting apparatus 2 detects a movement of an eyeball of a user from a captured image. A quantity of the movement detected by the eye-ball movement detecting apparatus 2 is detected as an angle in the horizontal direction and an angle in the vertical direction of the display 4 of a line of sight of a user about the reference straight line that is a straight line vertically entering the display 4. An angle signal representing the detected horizontal and vertical angles is input from the eye-ball movement detecting apparatus 2 to the PC 3. In the PC 3, the angles represented by the input angle signal are converted to a point of intersection of the line of sight of the user and the display 4, that is, a coordinate of a gazing point on the display 4 based on a distance between the eyeball of the user and the display 4. Since the coordinate acquired by the conversion is the gazing point of the user on the display 4, the coordinate is associated with the operation of the cursor to be displayed on the display 4.

For example, as illustrated in the explanatory diagram in FIG. 1, a user is initially gazing at the display 4 along the line of sight L1. The gazing point G1 of the user at that time is acquired by the conversion of an angle of the line of sight L1 about the reference straight line to the point G1 on the display 4 based on the distance from the eyeball of the user to the display 4. When the user moves the line of sight to a line of sight L2 thereafter, the angle of the line of sight about the reference straight line is at any time (or at 30 Hz) converted to the gazing point at the corresponding point in time even while the line of sight is moving. The display position of the cursor is controlled in accordance with the gazing point acquired by the conversion at the corresponding point in time. When the user gazes at the display 4 along the line of sight L2, the angle of the line of sight L2 about the reference straight line is converted to the gazing point G2 based on the distance from the eyeball of the user to the display 4, and the cursor is displayed at the position corresponding to the gazing point G2. Thus, the pointing device based on an eye-controlled input can be implemented.

Notably, in order to make the following description easily understandable, it is assumed that a position of an eyeball of a user is on the reference straight line that is equal to a normal to the display 4. The imaging apparatus 1 has a direction, height and position adjusted to image the eyeball of a user.

Figure 2:
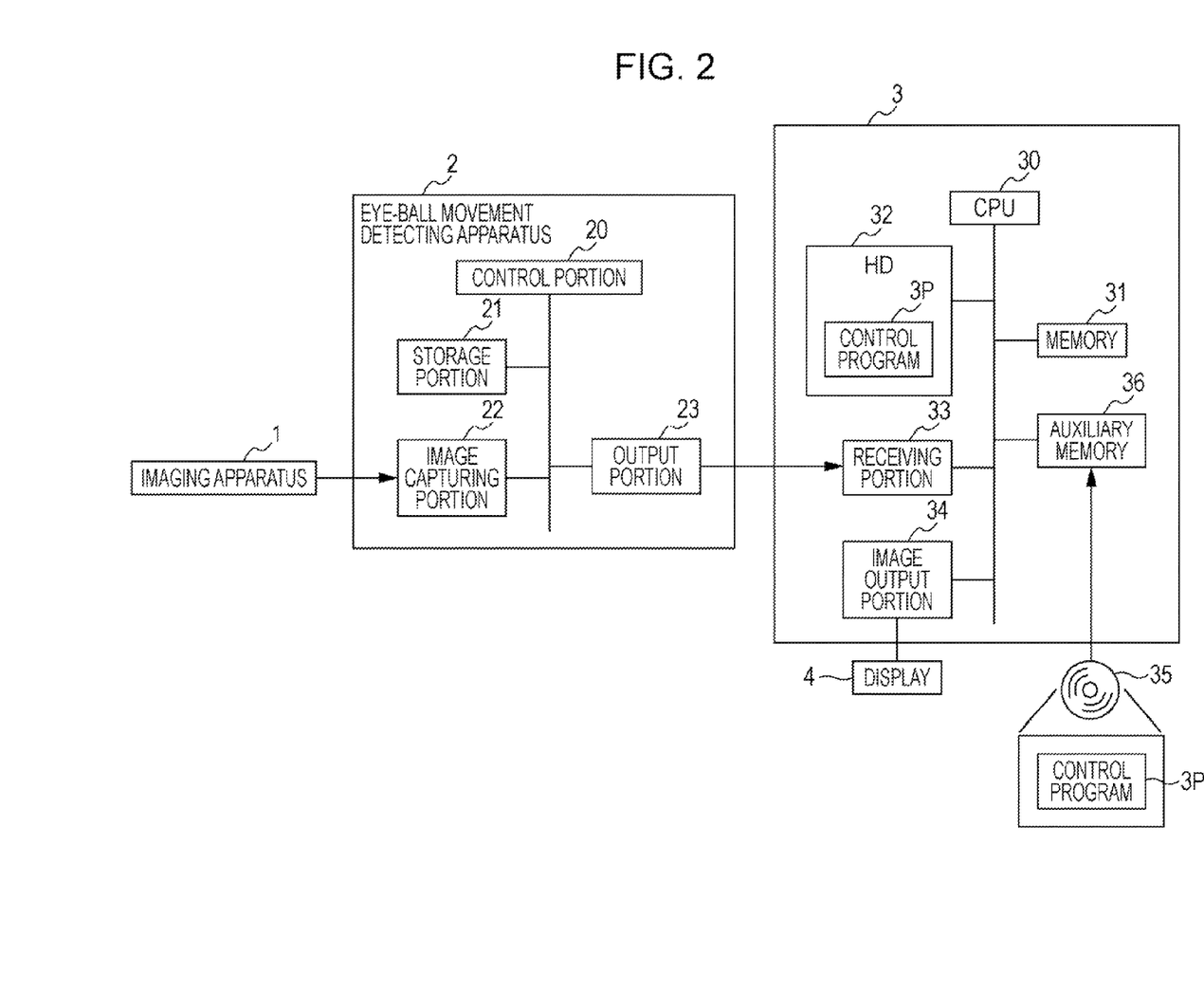
FIG. 2 is a block diagram illustrating an internal configuration of an eye-ball movement detecting apparatus and PC for implementing the pointing device according to the present embodiment.

FIG. 2 is a block diagram illustrating an internal configuration of the eye-ball movement detecting apparatus 2 and PC 3 for implementing the pointing device according to the present embodiment. The eye-ball movement detecting apparatus 2 includes a control unit 20 that controls the following components, a storage unit 21 that stores various information, an image acquiring unit 22 that acquires a captured image output from the imaging apparatus 1, and an output unit 23 that outputs an angle signal representing an angle of a line of sight corresponding to a movement of an eyeball of a user calculated by processing by the control unit 20. The PC 3 includes a CPU 30 (controller), a memory 31 applying a DRAM (dynamic random access memory), an SRAM (static random access memory) or the like, an HD (hard disk) 32 that stores various information, a receiving unit 33 that receives an angle signal output from the eyeball movement detecting apparatus 2, an image output unit 34 applying a video card, for example, and an auxiliary storage unit 36 that reads data in a storage medium 35 such as a DVD (digital versatile disk) and a CD-ROM.

The image acquiring unit 22 in the eye-ball movement detecting apparatus 2 acquires the captured images of an eyeball of a user imaged at a rate of 30 frames per second (30 Hz), for example. Notably, the captured image of an eyeball of a user imaged by the imaging apparatus 1 contains a pupil and a reflected light from a cornea surface as a result of the projection of near infrared light from the imaging apparatus 1 to an eyeball (which is called Purkinje image). The image acquiring unit 22 also acquires the captured image at a rate of 30 frames per second (30 Hz).

The control unit 20 in the eye-ball movement detecting apparatus 2 reads and executes a predetermined program stored in the storage unit 21 and thus detects the angle of the line of sight of the user based on the center of the pupil in the captured image acquired through the image acquiring unit 22 and the position of the Purkinje image on the captured image. Notably, in order to detect the angle based on the center of the pupil and the position of the Purkinje image on the captured image when the line of sight of the user is parallel to the reference straight line, the relationship between the center of the pupil and the position of the Purkinje image on the captured image and the angle is calibrated in advance. However, since the technology for detecting the angle of the line of sight based on the center of the pupil and the position of the Purkinje image is a known technology, the detail description will be omitted (Refer to Japanese Patent Application Laid-Open No. 2006-87751).

The control unit 20 of the eye-ball movement detecting apparatus 2 outputs the angle signal representing the detected angle of the line of sight of the user through the output unit 23 to the PC 3 every time the captured image is acquired at 30 Hz.

The HD 32 in the PC 3 stores a control program 3P causing the CPU 30 to perform processing of converting the angle signal representing the angle of the line of sight of the user to the gazing point on the display 4 and associating the result with the cursor display. Notably, the control program 3P is stored in the storage medium 35 such as a DVD and a CD-ROM, and the CPU 30 may read it through the auxiliary storage unit 36 from the storage medium 35 and store it in the HD 32.

The CPU 30 reads and executes the control program 3P to receive by the receiving unit 33 the angle signal output from the output unit 23 in the eye-ball movement detecting apparatus 2 and convert the received angle signal to the gazing point of the user on the display 4.

The image output unit 34 in the PC 3 receives a rendering signal for displaying a GUI (graphical user interface) on the display 4 from the CPU 30, creates an image signal therefrom, and outputs the created image signal to the display 4. The CPU 30 reads and executes the control program 3P to input the rendering signal for displaying a cursor at the position corresponding to the converted gazing point to the image output unit 34 and causing the image output unit 34 to output the image signal.

Notably, the CPU 30 does not handle the gazing point of the user acquired based on the angle signal received by the receiving unit 33 directly as the position for displaying the cursor. Whether the eyeball of the user is stopping or moving, the gazing point on the display 4 corresponding to the movement of the eyeball is not handled directly as the position for displaying the cursor for the reasons below.

The first reason is that, when a user is gazing at one point on the display 4, the gazing point is always moving slightly due to the slight involuntary eye movement though the user is intentionally gazing at one point. Thus, if the gazing point of the user is handled directly as the position for displaying the cursor, the cursor being displayed is always moving slightly. As a result, it is difficult for the user to keep gazing. Notably, the degree of the slight involuntary eye movement may vary among individuals and vary in accordance with the physical condition at the time.

The second reason is that, when something is moving near the gazing point, a phenomenon that the line of sight follows the moving object may occur. As described in the first reason, the slight involuntary eye movement causes the cursor to be always moving slightly. Thus, when the gazing point corresponding to the movement of the eyeball of the user is handled directly as the position for displaying the cursor, it is not only difficult for the user to keep gazing, but also the line of sight may follow the cursor being moving slightly and resonate with the slight movement, and thereby being further difficult for the user to keep gazing.

The third reason is that displaying a cursor always at a gazing point may simply fatigue the user's eyes. The user's eyes are fatigued when the cursor is moved and displayed faithfully in accordance with the movement of the line of sight of the user even while the user is not gazing.

Thus, a pointing device according to the present embodiment determines whether an eyeball of a user is stopping or not based on the gazing point on the display 4 acquired by the conversion from the angle corresponding to the movement of the eyeball of a user, as will be described later. Furthermore, when it is determined that the eyeball is stopping, the pointing device according to the present embodiment causes the cursor to be displayed as it is stopping even when the gazing point acquired by the conversion according to the slight movement of eyeball of the user is moving slightly on the display 4. Also when it is determined that the eyeball of the user is not stopping but is moving, the pointing device displays the cursor on a smooth locus like the Bezier curve based on the gazing points of the user, instead of displaying the cursor on the locus connecting the gazing points by the user as they are. Notably, the locus of the cursor to be displayed when it is determined that an eyeball of a user is moving is not limited to the Bezier curve but may be a smoothed locus.

Here, a method for determining by the CPU 30 in the PC 3 whether an eyeball of a user is stopping or not will be described. First of all, the processing of converting an angle for acquiring a gazing point of a user on the display 4 will be described.

Figure 3A:
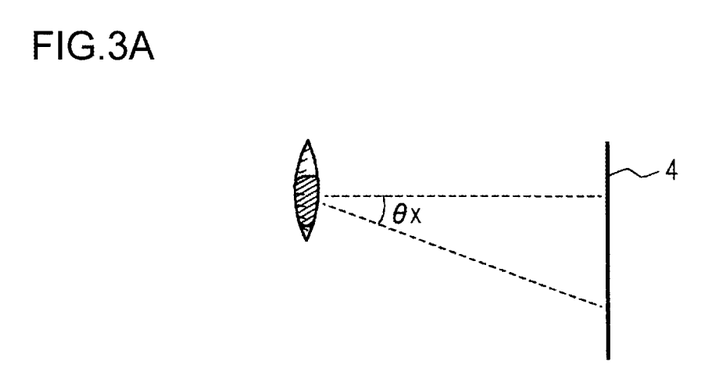
FIGS. 3A and 3B are schematic diagrams illustrating angles of a line of sight of a user, which are detected by the eye-ball movement detecting apparatus according to the present embodiment.
Figure 3B:
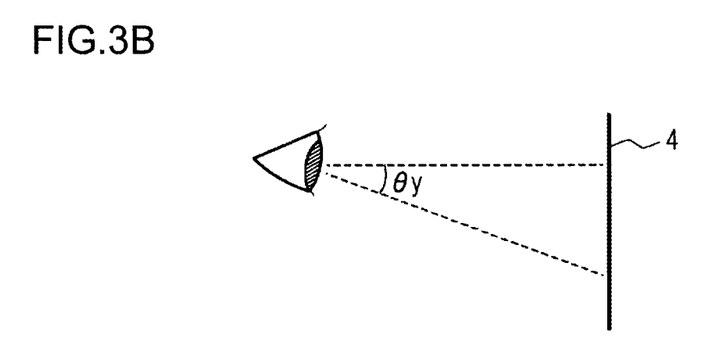

FIGS. 3A and 3B are schematic diagrams illustrating angles of a line of sight of a user, which are detected by the eye-ball movement detecting apparatus 2 according to the present embodiment. FIG. 3A illustrates the horizontal component θx to the display 4 of an angle between the reference straight line entering vertically the display 4 and line of sight, and FIG. 3B illustrates a vertical component θy to the display 4 of the angle between the reference straight line and the line of sight. Notably, the horizontal component θx of an angle between the reference straight line and the line of sight takes a positive value in the front right direction of the display 4, and the vertical component θy takes a positive value in the front upper direction of the display 4. Thus, since the vertical component θy illustrated in the schematic diagram in FIG. 3B directs to the lower part than the reference straight line, it has a negative value. The angle signal representing the θx and θy illustrated in FIGS. 3A and 3B based on the image resulting from the imaging of the eyeball of the user is output by the eye-ball movement detecting apparatus 2.

Figure 4:
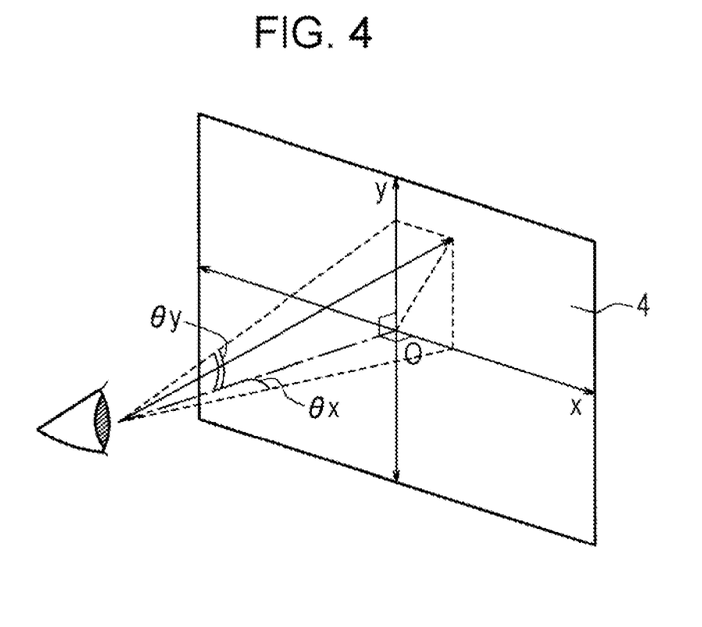
FIG. 4 is an explanatory diagram illustrating the principle for acquiring a gazing point of a user by the conversion based on an angle signal output from the eye-ball movement detecting apparatus according to the present embodiment.

FIG. 4 is an explanatory diagram illustrating the principle for acquiring a gazing point of a user by the conversion based on the angle signal output from the eye-ball movement detecting apparatus 2 according to the present embodiment. The explanatory diagram in FIG. 4 illustrates the principle for converting an angle of a line of sight of a user to a gazing point on the display 4 when the reference straight line enters vertically the center of the display 4 and an eyeball of a user positions at a position away from the reference straight line on the display 4 by a distance d. In the PC 3, a plane coordinate system is defined in which the center of the display 4 is the origin, and the right direction is the positive direction with the X-axis in the horizontal direction of the display 4 and the upper direction is the positive direction with the Y-axis in the vertical direction of the display 4. The CPU 30 converts the horizontal component θx and vertical component θy of the angle between the reference straight line and the line of sight, which are represented by the angle signal output from the eye-ball movement detecting apparatus 2 to the coordinate (x,y) representing the gazing point on the plane coordinate system based on the following expressions (1) and (2).

$$x = d \times \tan \theta x \quad (1); \text{ and}$$

$$y = d \times \tan \theta y \quad (2)$$

Notably, in the explanatory diagram illustrated in FIG. 4, the line of sight has an angle from the reference straight line in the upper right direction from the user's viewpoint. Since the components θx and θy have thus positive values, positive values are calculated for both of the x-component and y-component of the coordinate representing the gazing point. The gazing point of the user is identified as positioning in the first quadrant of the plane coordinate system.

Next, the processing will be described for determining whether an eyeball of a user is stopping or not, that is, whether the user intends to gaze one point or not from the coordinate on the display 4 of a gazing point of a user acquired based on the principle as illustrated in FIGS. 3A, 3B and FIG. 4.

Figure 5:
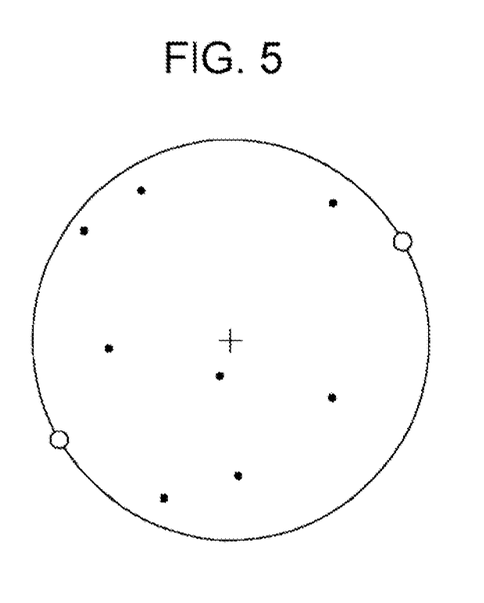
FIG. 5 is an explanatory diagram schematically illustrating the reference for determining that an eyeball of a user is stopping by a CPU in the PC according to the present embodiment.

FIG. 5 is an explanatory diagram schematically illustrating the reference for determining that an eyeball of a user is stopping by the CPU 30 in the PC 3 according to the present embodiment. The explanatory diagram in FIG. 5 illustrates black circle marks and white circle marks indicating gazing points of a user on the display 4, a "+(plus)" mark indicating the center point of the containing circle (which is the circle drawn by the solid line) having a minimum area that contains all of the gazing points indicated by the white circle marks and black circle marks. Even when a user intends to gaze one point on the display 4, the gazing points of the user are scattered as illustrated in the explanatory diagram in FIG. 5 due to the slight involuntary eye movement. Accordingly, the CPU 30 in the PC 3 calculates the containing circle having a minimum area containing all of the latest 10 gazing points, for example, as illustrated in FIG. 5, determines whether the coordinate of the gazing point of the user converted from the angle signal received next are contained in the calculated containing circle or not and thus determines whether the eyeball of the user is stopping or the user intends to gaze one point or not. The containing circle having a minimum area is calculated by, according to the present embodiment, calculating containing circles containing all of the latest 10 points among the circles having as their diameters the lines connecting arbitrary two points of the latest 10 points and extracting the containing circle having a minimum diameter from the calculated containing circles. The explanatory diagram in FIG. 5 illustrates that the circle having as its diameter the line connecting the two points indicated by the white circle marks is calculated as a minimum containing circle.

When it is determined that the eyeball of the user is stopping based on the criterion illustrated in FIG. 5, that is, while the calculated containing circle is containing the gazing points of the user, the CPU 30 stops and displays the cursor at the center point of the calculated containing circle. On the other hand, when the next acquired gazing point of the user is not contained in the containing circle, the CPU 30 determines that the eyeball of the user is moving, calculates the locus of the Bezier curve from the center point of the containing circle to the next gazing point of the user, and displays the cursor on the locus.

Notably, when it is determined whether an eyeball of a user is stopping or not based on the criterion illustrated in the explanatory diagram in FIG. 5 at all times from the beginning of the processing, the containing circle is calculated based on the latest gazing points while the user is moving the line of sight intentionally and is moving the eyeball as a result. Then, there is a possibility that a large containing circle occupying the most part of the display 4 may be calculated as the criterion. In this case, the gazing point may not be released from the containing circle that is the criterion for determining whether the eyeball is stopping or not, and the cursor may always be displayed at the center point of the containing circle. In order to solve this, a maximum value and a minimum value of the diameter of the containing circle being the criterion are predefined. Thus, when the diameter of the calculated containing circle exceeds the predefined maximum value, the containing circle is not used as the criterion for determining whether the eyeball is stopping or not, and it is determined that the eyeball of the user is moving.

According to the present embodiment, based on the determination whether a gazing point of a user is contained in a figure having a predetermined area for a predetermined period of time or longer or not, the CPU 30 in the PC 3 primarily determines whether the possibility that the eyeball of the user may be stopping is high or not. When the gazing point of the user is contained in the figure having the predetermined area for the predetermined period of time or longer, the CPU 30 calculates the containing circle containing the predetermined number of latest gazing points again and then determines whether the eyeball of the user is stopping or not based on the calculated containing circle.

Figure 6:
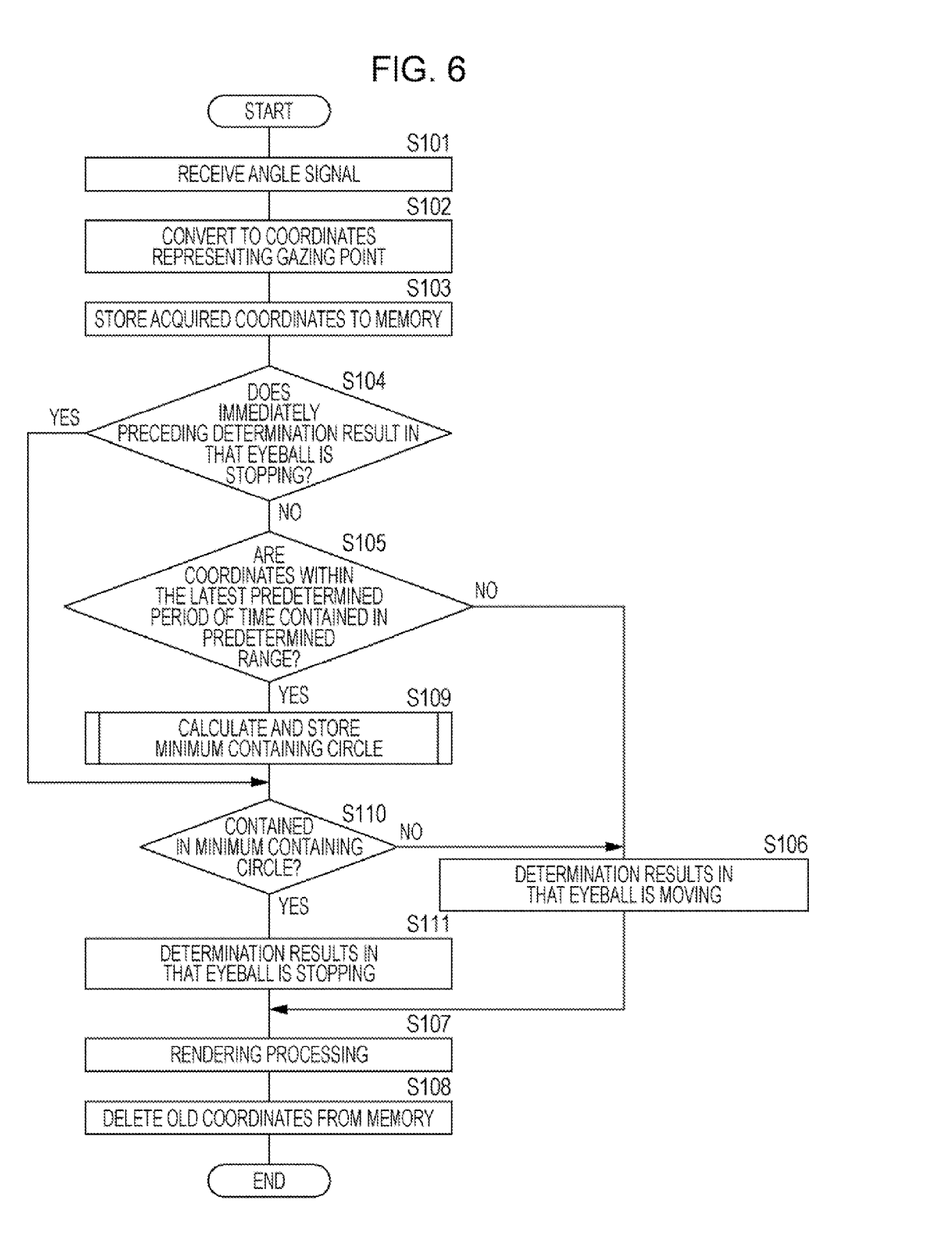
FIG. 6 is a flowchart illustrating a routine of cursor rendering processing based on an eye-controlled input by the CPU in the PC according to the present embodiment.

Next, the cursor rendering processing based on the above criterion will be described with reference to flowcharts. FIG. 6 is a flowchart illustrating a routine of cursor rendering processing based on eye-controlled input by the CPU 30 in the PC 3 according to the present embodiment.

The CPU 30 receives an angle signal through the receiving unit 33 from the eye-ball movement detecting apparatus 2 (step S101), converts the angle represented by the received angle signal to the coordinate representing the gazing point on the plane coordinate system on the display 4 (step S102). The CPU 30 stores the coordinate resulting from the conversion in the memory 31 temporarily (step S103), and determines whether a movement of an eyeball of a user based on the immediately preceding gazing point results in that the eyeball is stopping or not, that is, whether the user is gazing at one point or not (step S104).

When the CPU 30 determines in step S104 that the movement base on the immediately preceding gazing point does not result in that the eyeball is stopping (S104: NO), the CPU 30 determines whether the coordinates representing the gazing points within the predetermined latest period of time (such as 600 millisecond) are contained within a predetermined range (such as within a rectangle of 10×10 pixels) or not (step S105). When the CPU 30 determines that the coordinates representing the gazing points within the predetermined latest period of time are not contained within the predetermined range (S105: NO), the CPU 30 determines that the eyeball is moving (step S106). In this case, the CPU 30 performs rendering processing for displaying a cursor on the locus forming the Bezier curve corresponding to the coordinate acquired in step S102 (step S107), deletes the coordinates representing the oldest gazing point among the past coordinates beyond a predetermined number (such as 10 points) from the memory 31 (step S108), and ends the processing.

When the CPU 30 determines in step S105 that the coordinates within the predetermined latest period of time are contained in the predetermined range (S105: YES), the CPU 30 calculates the center and radius (or diameter) of the containing circle having a minimum area containing all of the predetermined number (such as 10) of latest coordinates and stores them in the memory 31 (step S109). The CPU 30 determines that the coordinate acquired in step S102 is contained in the minimum containing circle calculated in step S109 or not (step S110).

When the CPU 30 determines that the coordinate calculated in step S102 is not contained in the minimum containing circle stored in the memory 31 (S110: NO), the CPU 30 determines that the eyeball is moving (S106). Then, the CPU 30 performs rendering processing for displaying a cursor on the locus rendering the Bezier curve corresponding to the acquired coordinate (S107), deletes the coordinate representing the oldest gazing point from the memory 31 (S108), and ends the processing.

When the CPU 30 determines that the coordinate acquired in step S102 is contained in the minimum containing circle stored in the memory 31 (S110: YES), the CPU 30 determines that the eyeball is stopping (step S111). In this case, the CPU 30 performs rendering processing for display a cursor at the center point of the minimum containing circle (S107), deletes the coordinate representing the oldest gazing point from the memory 31 (S108), and ends the processing.

When the CPU 30 determines that the movement base on the immediately preceding gazing point results in that the eyeball is stopping in step S104 (S104: YES), the processing moves to step S110 where the CPU 30 determines whether the minimum containing circle calculated lately and stored in the memory 31 contains the coordinate acquired in step S102 or not (S110). Then, the CPU 30 performs the subsequent processing (from step S106 to step S108 or from step S111 and step S107 to step S108).

In order to perform the determination processing in step S105, the CPU 30 starts the processing in the flowchart in FIG. 6 after a lapse of at least 100 milliseconds from the first reception of the angle signal (when at least three coordinates exist as a result of the conversion at every 30 Hz).

Notably, the CPU 30 repeats the processing routine illustrated in the flowchart in FIG. 6 in the same timing of 30 Hz as the rate for receiving the angle signals from the eye-ball movement detecting apparatus 2.

In the processing illustrated in the flowchart in FIG. 6, when the CPU 30 in the PC 3 determines in step S104 that the movement base on the immediately preceding gazing point results in that the eyeball is stopping and determines even once that the coordinate acquired from the received angle signal is not contained in the minimum containing circle, the CPU 30 determines that the eyeball of the user is moving and the user intends to move the line of sight. However, without limiting thereto, when the CPU 30 determines that the coordinates representing the gazing points are not contained in the minimum containing circle plural times, the CPU 30 may determine that the eyeball is moving. Thus, even when the gazing point once leaves the minimum containing circle and the gazing point moves slightly again within the minimum containing circle due to the saltatory and slight movement of the eyeball like flicker or when it is detected that the eyeball is moving slightly due to a detection error on the angle by the eye-ball movement detecting apparatus 2, it may be determined that the eyeball is stopping.

The processing illustrated in the flowchart in FIG. 6 allows the determination whether an eyeball of a user is stopping or not in accordance with the characteristic of the slight involuntary eye movement which varies depending on an individual and also depending on the physical condition at the time of the individual. Whether the eyeball is stopping or not may be determined based on whether the gazing point is contained in a figure having a predetermined size with respect to some reference or not. However, in that case, in accordance with some characteristics of the slight movement which varies depending on an individual and also depending on the physical condition at the time of the individual, the slight movement of the eyeball, which is supposed to be determined as stopping may be determined as moving. In the case with the processing illustrated in the flowchart in FIG. 6, the criterion to be used after that for determining whether the eyeball is stopping or not is determined based on the predetermined number of actual latest gazing points. Therefore, in accordance with the characteristic of the slight involuntary eye movement which varies due to an individual difference and also depending on the physical condition at the time of the individual, the state that the eyeball is stopping, that is, the user is intentionally gazing one point can be determined.

Figure 7:
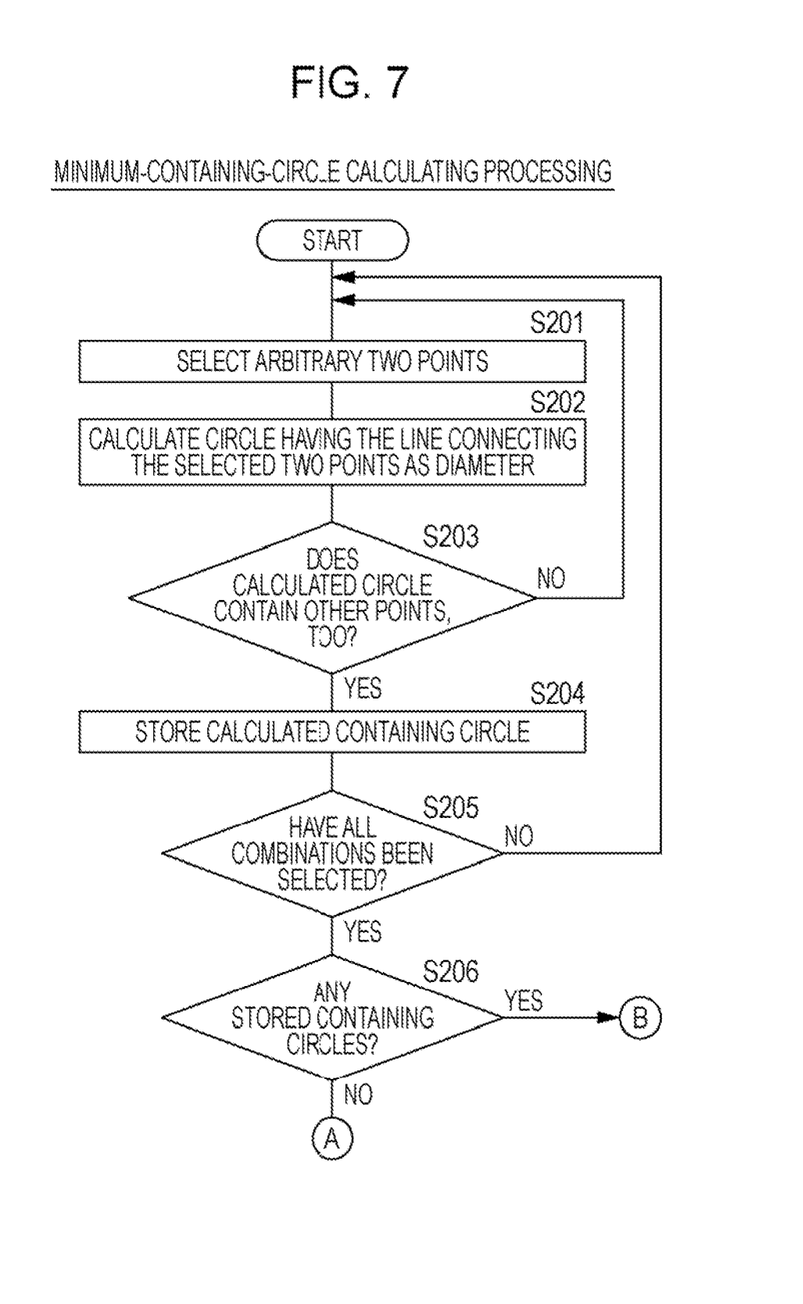
FIG. 7 is a flowchart illustrating an example of the processing routine for calculating a minimum containing circle in the cursor rendering processing by the CPU in the PC according to the present embodiment.
Figure 8:
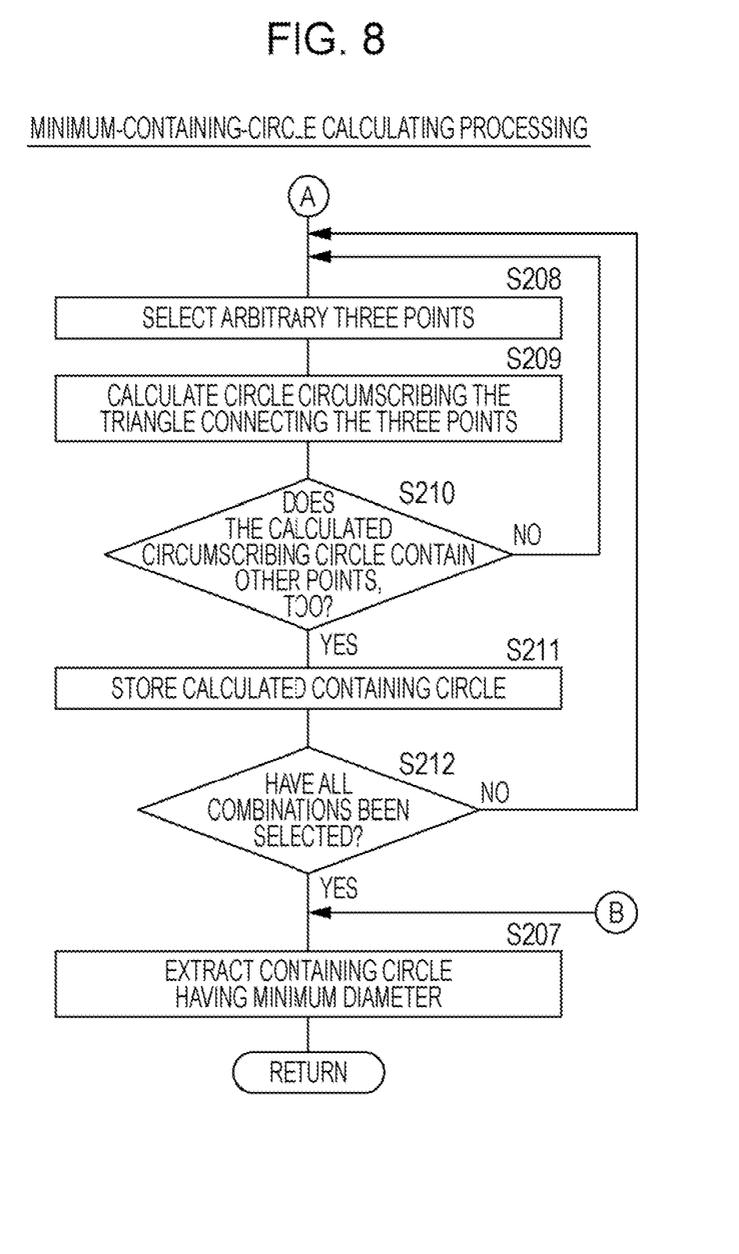
FIG. 8 is a flowchart illustrating the example of the processing routine for calculating a minimum containing circle in cursor rendering processing by the CPU in the PC according to the present embodiment.

FIG. 7 and FIG. 8 are flowcharts illustrating an example of the processing routine for calculating a minimum containing circle in cursor rendering processing by the CPU 30 in the PC 3 according to the present embodiment. Notably, the processing routine illustrated in the flowcharts in FIG. 7 and FIG. 8 corresponds to the details of the processing for calculating a minimum containing circle in step S109 within the processing routine illustrated in the flowchart in FIG. 6.

The CPU 30 selects arbitrary two points from the predetermined number (such as 10) of latest coordinates among the coordinates representing the gazing points stored in the memory 31 (step S201) and calculates the circle having the line connecting the selected two points as a diameter (step S202). Next, the CPU 30 determines whether the calculated circle contains all of the predetermined number (such as 10) of latest points or not (step S203).

When the CPU 30 determines that the calculated circle does not contain any of the predetermined number of latest points (S203: NO), the CPU 30 returns the processing to step S201 and selects other arbitrary two points (S201) and performs the subsequent processing.

When the CPU 30 determines that the calculated circle contains all of the predetermined number of latest points (S203: YES), the CPU 30 stores the center and radius of the calculated containing circle in the memory 31 (step S204).

The CPU 30 next determines whether all combinations of the two points have been selected from the predetermined number of latest coordinates among the coordinates representing the stored gazing points in step S201 or not (step S205). When the CPU 30 determines that all of the combinations have not been selected (S205: NO), the CPU 30 returns the processing to step S201, selects other arbitrary two points (S201), and performs the subsequent processing.

When the CPU 30 determines that all of the combinations have been selected (S205: YES), the CPU 30 determines whether any containing circle is stored in the memory 31 or not (step S206). That is, the CPU 30 determines in step S206 whether the circle having the line connecting any two points within the predetermined number of latest coordinates as its diameter and containing all of other coordinates exists or not.

When the CPU 30 determines that at least one containing circle is stored (S206: YES), the CPU 30 extracts the containing circle having a minimum diameter from the stored containing circles (step S207), ends the processing for calculating the minimum containing circle, and returns the processing to step S110 illustrated in the flowchart in FIG. 6.

When the circle having the line connecting any two points within the predetermined number of latest coordinates as its diameter and containing all of other coordinates does not exist, the CPU 30 next calculates a minimum containing circle based on three points.

When the CPU 30 determines no containing circle is stored (S206: NO), the CPU 30 selects arbitrary three points from the predetermined number of latest coordinates within the coordinates representing the gazing points stored in the memory 31 (step S208) and calculates the circumscribing circle of the triangle formed by the selected three points (step S209). The CPU 30 determines whether the calculated circumscribing circle contains all of the predetermined number (such as 10) of latest points or not (step S210).

When the CPU 30 determines that the calculated circumscribing circle does not contain any of the predetermined number of latest points (S210: NO), the CPU 30 returns the processing to step S208, selects other arbitrary three points (S208), and performs the subsequent processing.

When the CPU 30 determines that the calculated circumscribing circle contains all of the predetermined number of latest points (S210: YES), the CPU 30 stores the center and radius of the calculated circumscribing circle as the containing circle in the memory 31 (step S211).

The CPU 30 next determines whether all combinations of three points have been selected from the predetermined number of latest coordinates within the coordinates representing the stored gazing points in step S208 or not (step S212). When the CPU 30 determines that all of the combinations have not been selected (S212: NO), the CPU 30 returns the processing to step S208, selects other arbitrary three points (S208), and performs the subsequent processing.

When the CPU 30 determines that all of the combinations have been selected (S212: YES), the CPU 30 extracts the containing circle having a minimum diameter among the containing circles stored in the memory 31 (S207), ends the processing for calculating the minimum containing circle and returns the processing to the step S110 illustrated in the flowchart in FIG. 6.

The processing for calculating a minimum containing circle may alternatively include first calculating a circle having a predetermined diameter, determining whether the calculated circle contains all of the coordinates representing some latest gazing points or not, and, when not, determining again whether the calculated circle having an increased diameter contains all of the coordinates representing some latest gazing points or not, or, when so, determining again whether the calculated circle having a reduced diameter contains all of the coordinates representing some latest gazing points or not. Thus, by repeating the processing, a minimum containing circle can be calculated. However, a higher processing speed can be expected from the calculation of a minimum containing circle by the processing routine illustrated in the flowchart in FIG. 7 and FIG. 8.

Figure 9:
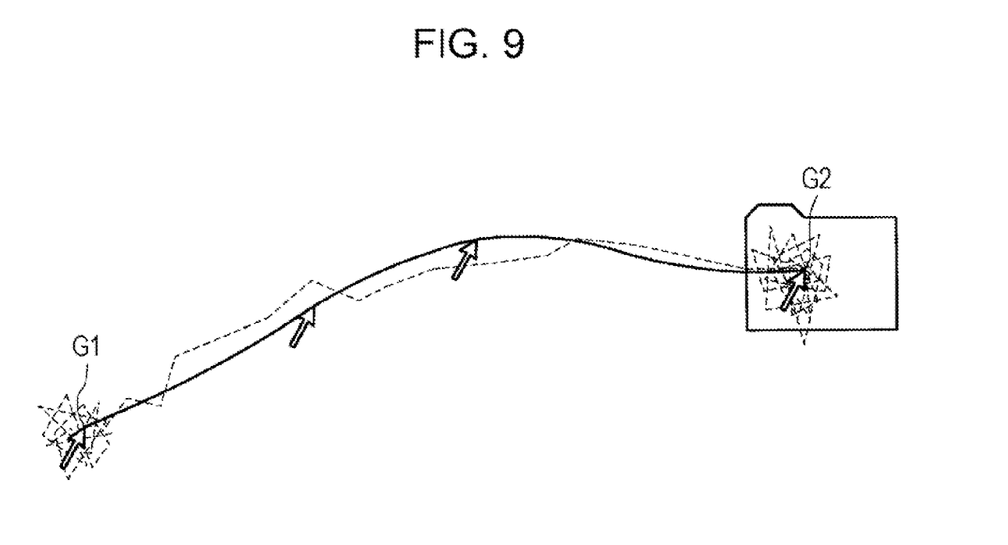
FIG. 9 is an explanatory diagram illustrating an example of a locus of a cursor displayed based on eye-controlled input with a pointing device according to the present embodiment.

FIG. 9 is an explanatory diagram illustrating an example of the locus of a cursor displayed based on eye-controlled input with a pointing device according to the present embodiment. The explanatory diagram in FIG. 9 shows a movement of a gazing point corresponding to a movement of an eyeball of a user until the user intentionally gazes an icon representing a folder displayed on the display 4, and a movement of a cursor to be displayed in accordance with the gazing points. The locus represented by the dashed line in FIG. 9 indicates the locus connecting the gazing points by a user, which are specified based on the angle signal output from the eyeball movement detecting apparatus 2. The locus represented by the dashed line is a locus of the cursor to be displayed so as to reproduce the movement of the gazing point by the user as it is. In this case, even while the user is intentionally gazing one point, the cursor is moving slightly. Also when the user moves the line of sight, the movement of the cursor is not smooth, and it is difficult for the user to keep watching the display 4.

On the other hand, the locus represented by the solid line in FIG. 9 is a locus of the cursor to be displayed as a result of the processing routine illustrated in the flowchart in FIG. 6 by the CPU 30 based on the gazing points by the user resulting from the conversion. At the point G1 being the starting point and the point G2 being the end point of the locus represented by the solid line in the FIG. 9, the state that the eyeball of the user is stopping is determined, and the cursor is displayed still. When the user has the intension to stop his/her eyeball, that is, the intension to gaze one point, the processing illustrated in the flowchart in FIG. 6 highly possibly determines that the eyeball is stopping even while the gazing point on the display 4 is moving slightly in accordance with the movement of the eyeball of the user. As a result, the cursor is displayed as stopping at one point.

In this way, performing the above processing by the CPU 30 allows the determination that the eyeball is stopping in accordance with the characteristic of the slight movement of the gazing point including the slight involuntary eye movement by each user. Thus, as illustrated in the explanatory diagram in FIG. 9, the pointing device based on eye-controlled input can be implemented, which allows display of a cursor naturally to a user.

The pointing device according to the present embodiment can implement not only the cursor display processing as described above but also the operation of clicking or double-clicking on an icon as illustrated in the explanatory diagram in FIG. 9. For example, when the CPU 30 in the PC 3 determines that a gazing point of a user is stopping on a region of an icon for a predetermined period of time or longer, the CPU 30 determines that the icon has been selected. In this case, not only "select" but also "click operation" and "double-click operation" may be associated with the cursor. Thus, the click operation or double click operation based on an eye-controlled input can be implemented. For example, menu icons corresponding to "select", "click" and "double click" are displayed on the display 4 in advance, and when the state that the gazing point is on one of the menu icons and the eyeball is stopping there is determined, the corresponding processing may be associated with the cursor, and it may be determined that the processing is performed at the gazing point where the state that the eyeball is stopping is determined next. Furthermore, an object such as a pen and a brush in a GUI as in Windows (registered trademark) may be associated with the cursor so that a rendering operation based on the eye-controlled input may be implemented.

Notably, the eyeball movement detecting apparatus 2 according to the present embodiment uses the cornea reflection technique to detect an angle. However, the present invention is not limited thereto but may alternatively apply another technology such as EOG (electro-oculogram) and scleral reflection technique if the technology can detect the angle of the line of sight corresponding to the movement of the eyeball.

The moving object detecting apparatus is also applicable not only to a pointing device, as described above, that detects a movement of a line of sight of a human being and associates it with a two-dimensional cursor movement on the display 4 but also to an apparatus that determines that a one-dimensional or three-dimensional movement by a moving object is stopping.

For example, the present invention is applicable to a three-dimensional technology in which, among movements of an arm or finger of a human being, a rotation is detected by an acceleration sensor or a shift is detected by an image sensor, an infrared ray sensor or the like, and a robot arm is moved so as to reproduce the detected movement of the arm or finger. Such a robot arm can be used for a work in a space where it is difficult for a human being to stay or for a remote operation. When the moving object detecting apparatus and/or method is applied to such a robot arm, the robot arm can be stopped when the state that an arm or finger of a human being is stopping is determined without reflection of shaking of the arm or finger even when the human being intends to stop the arm or finger but the arm or finger shakes. In this way, the present invention is applicable to a robot arm that can determine that a part of a body such as an arm or finger is stopping in accordance with the characteristic of shaking which varies due to an individual difference and correct and reproduce a movement.

The invention claimed is:

1. A moving object detection apparatus, comprising:
   a receive unit configured to sequentially receive a physical quantity corresponding to a movement of a moving object;
   a controller configured to convert physical quantities received for a period of time by the receive unit to coordinates on a coordinate system; and
   a storage unit configured to store the coordinates converted to by the controller,
   wherein the controller is configured to:
   detect the movement of the moving object based on a change in one or more of the coordinates,
   calculate a circle on the coordinate system that includes a minimum size which contains the coordinates, wherein the calculated circle includes a line formed by two arbitrary points among the coordinates as a diameter thereof,
   determine whether the calculated circle contains all of the coordinates or not,
     wherein the calculated the circle includes a minimum diameter among circles determined to contain all of the coordinates, and wherein the calculated circle is designated as a first figure;
   determine whether at least one of the coordinates converted from the physical quantity received by the receive unit is contained in the first figure or not, after the first figure is calculated, and
   in response to the determination that the at least one of the coordinates is contained in the first figure, determine that the moving object is stopping or has stopped.

2. The moving object detection apparatus according to claim 1, wherein the controller is configured to:
   calculate a circumscribe figure of a second figure formed by a number of coordinates among the coordinates,
   determine whether the calculated circumscribe figure contains all of the coordinates or not, and
   calculate the second figure that includes a minimum size among circumscribed figures determined to contain all of coordinates.

3. The moving object detection apparatus according to claim 1, wherein the controller is configured to determine whether the coordinates are contained in a first space that occupies a particular size or not, and
   in response to the determination that the coordinates are contained in the first space, the controller is configured to calculate a second space.

4. A moving object detecting apparatus, comprising:
   receiving means for sequentially receiving a physical quantity corresponding to a movement of a moving object;
   converting means for converting physical quantities received for a period of time by the receiving means to coordinates on a coordinate system;
   means for detecting the movement of the moving object based on a change in the coordinates converted to by the converting means;
   means for storing the coordinates converted to by the converting means;
   calculating means for calculating a circle on the coordinate system that includes a minimum size that contains the coordinates, wherein the calculated circle includes a line formed by two arbitrary points among the coordinates as a diameter thereof;
   means for determining whether the calculated circle contains all of the coordinates or not
     wherein the calculated circle includes a minimum diameter among circles determined to contain all of the coordinates, and wherein the calculated circle is designated as a first figure;
   means for determining whether at least one of the coordinates converted from the physical quantity received by the receiving means is contained in the first figure or not, after the first figure is calculated; and
   means for, in response to the determination that the at least one of the coordinates is contained in the first figure, determining that the moving object is stopping or has stopped.

5. The moving object detecting apparatus according to claim 4, wherein the calculating means includes:
  means for calculating a circumscribe figure of a second figure formed by a number of coordinates among the coordinates; and
  means for determining whether the calculated circumscribe figure contains all of the coordinates or not, and
  the calculating means calculates the second figure that includes a minimum size among circumscribe figures determined to contain all of coordinates.

6. The moving object detecting apparatus according to claim 4, further comprising means for determining whether the coordinates are contained in a first space occupies a particular size or not,
  in response to the determination that the coordinates are contained in the first space, the calculating means calculates a second space.

7. A moving object detection method comprising:
  sequentially receiving a physical quantity corresponding to a movement of a moving object;
  converting physical quantities received for a period of time to coordinates on a coordinate system;
  storing the coordinates;
  detecting the movement of the moving object based on a change in the coordinates;
  calculating a circle on the coordinate system that includes a minimum size that contains the coordinates, wherein the calculated circle includes a line formed by two arbitrary points among the coordinates as a diameter thereof;
  determining whether the calculated circle contains all of the coordinates or not;
    wherein the calculated circle includes a minimum diameter among circles determined to contain all of the coordinates, and wherein the calculated circle is designated as a first figure;
  determining whether at least one of the coordinates corresponding to the received physical quantity is contained in the first figure or not, after the first figure is calculated; and
  in response to the determination that the at least one of the coordinates is contained in the first figure, determining that the moving object is stopping or has stopped.

8. A pointer device, comprising:
  a receive unit configured to receive sequentially an angle of a line of sight of a user to a display, wherein the angle of the line of sight of the user corresponds to a movement of an eyeball of the user;
  a controller configured to convert angles received for a period of time by the receive unit to coordinates representative of gaze points of the user on the display; and
  a storage unit configured to store the coordinates converted to by the controller,
  wherein the controller is configured to:
  detect the movement of the eyeball based on a change in the coordinates,
  cause the display to display a cursor in accordance with the detected movement of the eyeball,
  determine whether the coordinates are contained in a first figure that occupies an area on the display or not,
  in response to the determination that the coordinates are contained in the first figure, calculates a circle that includes a minimum diameter among circles determined to contain all of the coordinates, wherein the calculated circle is designated as a second figure on the display, and wherein the calculated circle includes a line formed by two arbitrary points among the coordinates as a diameter thereof;
  determine whether at least one of the coordinates converted from the angle of the line of sight of the user received by the receive unit is contained in the second figure or not, after the second figure is calculated,
  in response to the determination that the at least one of the coordinates is contained in the second figure, determine that the eyeball is stopping or has stopped, and
  in response to the determination that the eyeball is stopping or has stopped, cause the display to display a still cursor.

9. The pointer device according to claim 8, wherein the controller is configured to:
  calculate a circumscribe circle of a triangle formed by arbitrary three points among the coordinates, and
  determine whether the calculated circumscribe circle contains all of the coordinates or not,
  wherein the calculated circumscribe circle that includes a minimum diameter among circumscribed circles determined to contain all of the coordinates, and wherein the calculated circumscribe circle is designated as a third figure.

10. A pointing device, comprising:
  receiving means for sequentially receiving an angle of a line of sight of a user to a display, wherein the angle of the line of sight of the user corresponds to a movement of an eyeball of the user;
  converting means for converting angles received for a period of time by the receiving means to coordinates representative of gaze points of the user on the display;
  means for detecting the movement of the eyeball based on a change in the coordinates converted by the converting means;
  means for displaying a cursor on the display in accordance with the detected movement of the eyeball;
  means for storing the coordinates converted to by the converting means;
  means for calculating a circle that includes a line formed by two arbitrary points among the coordinates as a diameter thereof;
  means for determining whether the coordinates are contained in the calculated circle as a first figure that occupies an area on the display or not;
    wherein the calculated circle includes a minimum diameter among circles determined to contain all of the coordinates, and wherein the calculated circle is designated as the first figure on the display;
  means for determining whether at least one of the coordinates converted by the converting means from the angle of the line of sight of the user received by the receiving means is contained in the first figure or not, after the first figure is calculated; and
  means for, in response to the determination that the at least one of the coordinates is contained in the first figure, determining that the eyeball is stopping or has stopped,
  wherein in response to the determination that the eyeball is stopping or has stopped, a still cursor is displayed.

11. The pointing device according to claim 10, wherein the calculating means includes:
  means for calculating a circumscribe circle of a triangle formed by arbitrary three points among the stored coordinates; and
  means for determining whether the calculated circumscribe circle contains all of the coordinates or not, and
  wherein the calculated circumscribe circle includes a minimum diameter among circumscribe circles determined to contain all of the coordinates, and wherein the calculated circumscribe circle is designated as a second figure.

12. A non-transitory computer-readable medium including computer-readable instructions stored therein, the instructions being executable by a processor of a computing device, the instructions being executable to:
- cause the computer to convert physical quantities corresponding to a movement of a moving object received sequentially for a period of time to coordinates on a coordinate system;
- cause the computer to store the coordinates;
- cause the computer to detect the movement of the moving object based on a change in the coordinates;
- cause the computer to calculate a circle that includes a minimum size which contains the coordinates on the coordinate system;
  - wherein the calculated circle includes a minimum diameter among circles determined to contain all of the coordinates, and wherein the calculated circle is designated as a first figure;
- cause the computer to determine whether at least one of the coordinates is contained in the first figure or not, after the first figure is calculated; and
- cause the computer to, in response to the determination that the at least one of the coordinates is contained in the first figure, determine that the moving object is stopping or has stopped.

13. A non-transitory computer-readable medium including computer-readable instructions stored therein, the instructions executable by a processor of a computing device, the computing device coupled to a display, the instructions being executable to:
- cause the computer to convert an angle of a line of sight of a user to the display, wherein the angle of the line of sight of the user corresponds to a movement of an eyeball of the user and are received sequentially for a period of time, to coordinates representative of gaze points of the user on the display;
- cause the computer to store the coordinates;
- cause the computer to detect the movement of the eyeball based on a change in the coordinates;
- cause the computer to display a cursor on the display in accordance with the detected movement of the eyeball;
- cause the computer to calculate a circle that includes a line formed by two arbitrary points among the coordinates as a diameter thereof;
- cause the computer to determine whether the coordinates are contained in the calculated circle as a first figure that occupies an area on the display or not;
- wherein the calculated circle includes a minimum diameter among circles determined to contain all of the coordinates, and wherein the calculated circle is designated as the first figure on the display;
- cause the computer to determine whether at least one of the coordinates converted from the received angle of the line of sight of the user is contained in the first figure or not, after the first figure is calculated;
- cause the computer to, in response to the determination that the at least one of the coordinates is contained in the first figure, determine that the eyeball is stopping or has stopped; and
- cause the computer to, in response to the determination that the eyeball is stopping or has stopped, display a still cursor.

* * * * *

UNITED STATES PATENT AND TRADEMARK OFFICE
CERTIFICATE OF CORRECTION

PATENT NO. : 8,717,292 B2  Page 1 of 1
APPLICATION NO. : 12/666222
DATED : May 6, 2014
INVENTOR(S) : Niikawa It is certified that error appears in the above-identified patent and that said Letters Patent is hereby corrected as shown below:

In the Drawings

In Fig. 7, Sheet 6 of 8, delete " MINIMUM-CONTAINING-CIRCLE " and insert -- MINIMUM-CONTAINING-CIRCLE --, therefor.

In Fig. 8, Sheet 7 of 8, delete " MINIMUM-CONTAINING-CIRCLE " and insert -- MINIMUM-CONTAINING-CIRCLE --, therefor.

In the Claims

In Column 12, Line 9, in Claim 1, delete "calculated the" and insert -- calculated --, therefor.

In Column 12, Line 55, in Claim 4, delete "or not" and insert -- or not; --, therefor.

Signed and Sealed this
Ninth Day of September, 2014

Michelle K. Lee
*Deputy Director of the United States Patent and Trademark Office*